March 24, 1970 S. A. CRAFOORD 3,502,222

ADJUSTABLE SUPPORT RACK

Filed Jan. 8, 1968 3 Sheets-Sheet 1

INVENTOR
SIXTEN A. CRAFOORD

BY George H. Baldwin

ATTORNEY

INVENTOR
SIXTEN A. CRAFOORD

BY George H. Baldwin

ATTORNEY

ADJUSTABLE SUPPORT RACK

Filed Jan. 8, 1968 3 Sheets-Sheet 3

INVENTOR.
Sixten A. Crafoord
BY George H. Baldwin
ATTORNEY 3,502,222
ADJUSTABLE SUPPORT RACK
Sixten A. Crafoord, 1851 E. 21st St., Jacksonville, Fla. 32212
Filed Jan. 8, 1968, Ser. No. 696,235
Int. Cl. A47f *5/00, 5/10*
U.S. Cl. 211—40 12 Claims

ABSTRACT OF THE DISCLOSURE

An adjustable support structure comprising interconnecting slotted support members with arms hingedly mounted thereon at selectable locations. The arms are keyed for slidable reception in inwardly enlarged slots formed in the support for removal or repositioning as desired. Certain of the arms are specifically adapted as holders for phonograph records.

BACKGROUND OF THE INVENTION

This invention relates generally to supports and more specifically to adjustable supports. The invention as to one aspect specifically contemplates arrangements suited for storage or display racks of phonograph records or the like.

There are many devices in the prior art, such, for example, as peg board mounted hooks, for providing support, storage or display of various fixtures and articles. This present invention finds particular utility in connection with the storage and/or display of phonograph records or the like. Although the invention is specifically described hereinafter as applied to phonograph records, it should be understood that the invention may also be used in connection with other articles as appropriate.

Storage of phonograph records presents particular problems in that, for maximum utility, the records must be stored in such a manner that they are readily available for identification and use. It is particularly important that phonograph records be stored on edge rather than in a stacked condition since the weight and pressure imposed by stacked storage imparts deformation and distortion to records stored in this manner. Stacking also limits accessibility to the individual records.

There are many devices in the prior art for storing and displaying records in the general manner contemplated by this invention. When stored in prior art devices, records are generally not readily available for identification or viewing, since access to the side surfaces thereof is impeded by the adjacent records. The record jacket must, therefore, either be provided with identification along an exposed edge thereof or the jacket or record must be withdrawn from the holder to expose the side surfaces. This problem exists in devices intended for home storage of records as well as in racks for commercial display or storage, such as those designed for retail stores. In the latter case, such storage also precludes effective display of the records in the storage racks and other space must be made available in the area of the record storage for flat display of record jackets. Such display areas may occupy a major portion of the usable area in the modern retail outlet stores.

The present storage arrangements provide improved flexibility as to the modes of use, are themselves attractive and ornamental and have esthetic appeal apart from and in addition to utility in supporting and attractively displaying or holding articles.

SUMMARY OF THE INVENTION

This invention provides a support particularly adapted for record storage devices, which overcomes the disadvantages of the prior art by providing a support having a plurality of vertical slots formed to receive keyed support arms therein. The slots and the keys are similarly configured with an enlarged inner portion in the slot adapted to receive the key for retaining the arms on the support. In the case of a record storage device the arms comprise in one embodiment a holder consisting of an open frame having intersecting vertical and horizontal channels adapted to hold a record or record jacket in such a manner that the planar surfaces of the record or jacket are exposed over substantially the entire area thereof. The key member is hingedly attached to the vertical member so that a pivotal connection between the holder and the support is furnished. According to another embodiment, record storage is provided by a pair of small key elements arranged to engage and hold record jackets at two of the corners thereof. Elongated stops, configured to slidably fit in the slots, provide means to fix the vertical location of the holders. By mounting a plurality of holders in corresponding slots in the support member, a series of records may be stored in side-by-side adjacent relationship, readily available for inspection or display by pivotal movement of the holders.

With elongated slots in the support member and stops of suitable length disposed in the slots, the holders may be positioned vertically as desired and may also be arranged in superimposed rows to increase the capacity of the device or the effectiveness of the display. The holder may also be incorporated into an architectural panel forming the wall of a room or a divider, or they may be interlocked to face outwardly in a post-like structure, and the slots in the support may be used for other or additional purposes, such as for the mounting of shelves, or other type supports, thereby increasing the versatility and utility of the device. While planar panels are shown herein, the panels may comprise a linear exposed face having curvature in the direction perpendicular to the slots thereof, and, for example, the exposed face may be in the shape of a cylinder or portion of a cylinder with straight and parallel slots in said face. One or both faces of the support member may be provided with slots as desired. The teachings of this invention may also be incorporated into elongated supports utilized as means to mount arms for supporting drapery or the like, and other and various uses will occur to those skilled in the art.

BRIEF DESCRIPTION OF THE DRAWINGS

The objects and advantages of this invention will become better understood by reference to the following detailed description when viewed in light of the accompanying drawings, wherein.

DESCRIPTION OF THE INVENTION

Figures 1, 2, 3, 4:
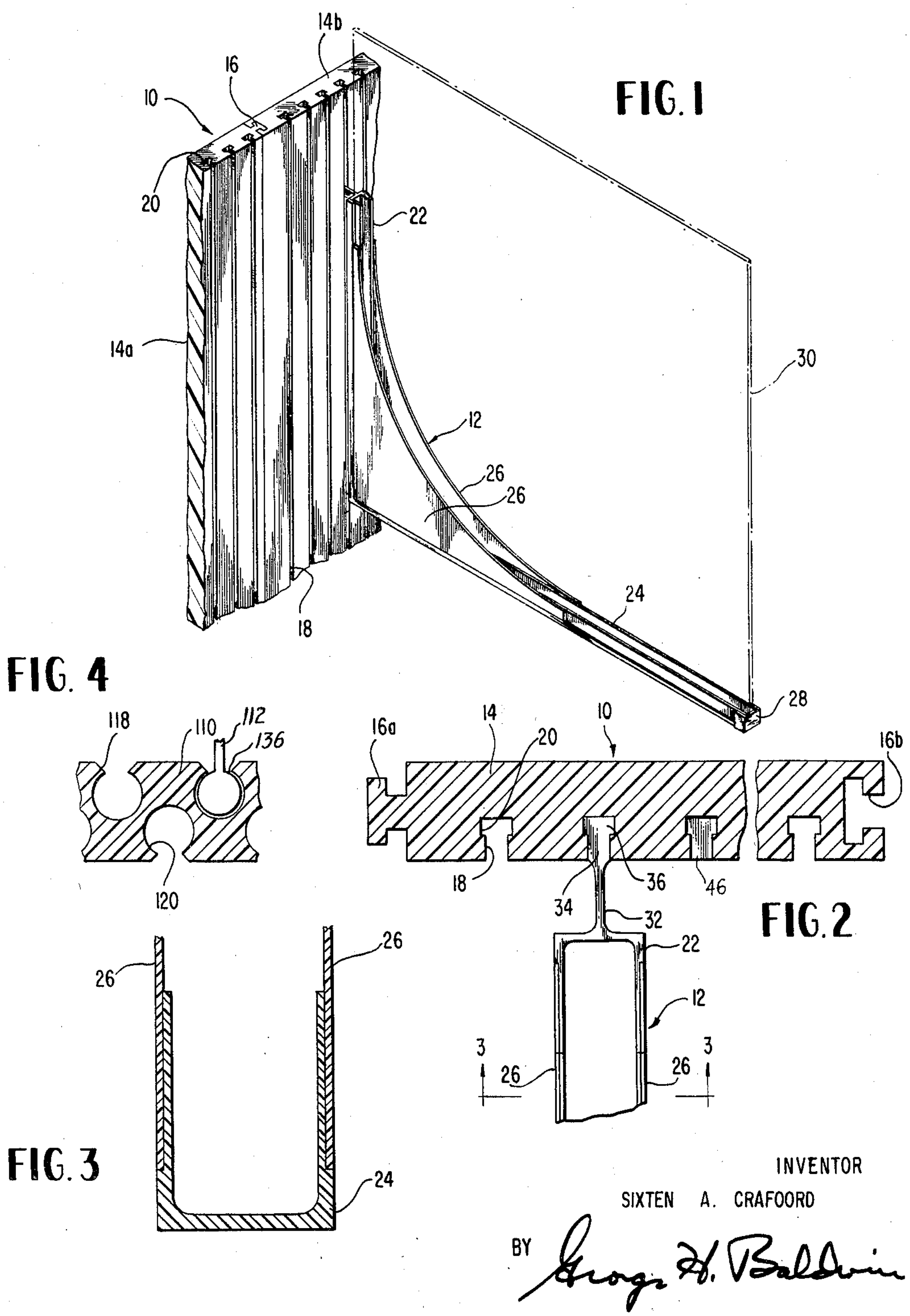
FIGURE 1 is a fragmentary perspective view of a first embodiment of a record holder and a portion of the support in accordance with the invention.
FIGURE 2 is an enlarged fragmentary sectional plan view of the device of FIGURE 1.
FIGURE 3 is a further enlarged fragmentary sectional view of a portion of the holder of FIGURE 2.
FIGURE 4 is a view similar to FIGURE 3 showing a fragmentary portion of another support in accordance with the invention.

Referring now to FIGURE 1, the device illustrated therein comprises a planar support member shown generally at 10 with a holder shown generally at 12 mounted thereto. The support member 10 is preferably made up of a plurality of vertical segments, the adjacent edges of a pair of which are shown at 14A and 14B, respectively. The segments 14A and 14B are interconnected by a key and groove joint as shown at 16. One of the planar surfaces of the segments 14A and 14B has formed therein a plurality of vertically disposed grooves 18, which grooves are provided with an enlarged inner portion 20.

The holder 12 comprises intersecting vertical and horizontal channel members 22 and 24, respectively, structurally braced by webs 26 and disposed to span their intersecting ends. An end closure member 28 is fixed to the outermost end of the horizontal channel 24. As can be seen by reference to FIGURE 1, the aforedescribed holder structure is ideally adapted to hold, for storage or display purposes, a record jacket shown in phantom lines at 30.

By reference now to FIGURE 2, the remaining structure of the aforedescribed holder is illustrated in enlarged section. As can be seen more clearly in FIGURE 2, the holder 12 is connected to the support 10 by means of a connecting throat portion in the form of hinge member 32 joined along the transverse surface of the channel member 22 and connecting the channel member to a key 34 having an enlarged rectangular end 36 at the rear end thereof.

The key 34 and enlarged end 36 are configured to slidably fit and to be caged in the slot 18. The opening of the slot through the support member surface is narrower than the enlarged portion 20 which is disposed inwardly of the support member surface, whereby the holder 12 is supportedly mounted on the support 10. The key is removable from the slot by sliding it upwardly out of the upper end of the slot.

In FIGURE 3, a further enlarged section shows the assembly details of the horizontal channel member 24 and the webs 26. The aforedescribed component may be fabricated from any material suitable for the purpose. As an example, the support member 10 may be fabricated from a lightweight metal such as aluimnum or from a plastics material or from other inexpensive, non-corrodible material. Aluminum and extrudable plastics are particularly suited for this purpose since they may be extruded and thereby the support may be fabricated with the grooves 18 and the tongue and groove structure 16 integrally formed therein. The holder 12 is preferably fabricated of a material such, for example, as a plastics material and, particularly for the portion thereof including the hinge member 32, from a flexible plastic such as polypropylene which has been found to be bending. By use of polypropylene or the like, the member 32 may be made integral with the vertical channel member 22 and the key 34, thereby inherently providing a hinged or pivotal connection to the support 10.

With reference now to FIGURE 4, a variation in accordance with the invention is illustrated in fragmentary section. In this embodiment, components corresponding to like components of the preceding figures are indicated by like numerals of the next higher order. In this embodiment slots 118 are formed in both planar surfaces of the support member 110 and have a sectional configuration differing from that described in the preceding embodiment. In this embodiment, the slots 118 are chamfered inwardly and terminate in cylindrical enlargements 120. The corresponding key having a cylindrical enlarged end portion 136 for the holder 112 of this embodiment is configured for a caged slidable fit in the cylindrical enlargement 120. Moreover, according to this embodiment, the holder 112 may swing back and forth without the need of any hinge section such as shown at 32 in FIGURE 2. The swinging will be about the axis of the cylindrical enlarged key portion 136 and of the cylindrical slot enlargement 120, and this embodiment is particularly desirable if the holder is to be of metal, since swinging is permitted without the necessity of including a hinging portion of the holder. If the holder 112 is provided with a hinge section as well as with a cylindrical key portion 136, even greater latitude for swinging is permitted. By providing slots 118 on either face of the support 110, holders may be connected therewith to extend in either direction, thereby doubling the capacity of the device.

Figures 5, 6:
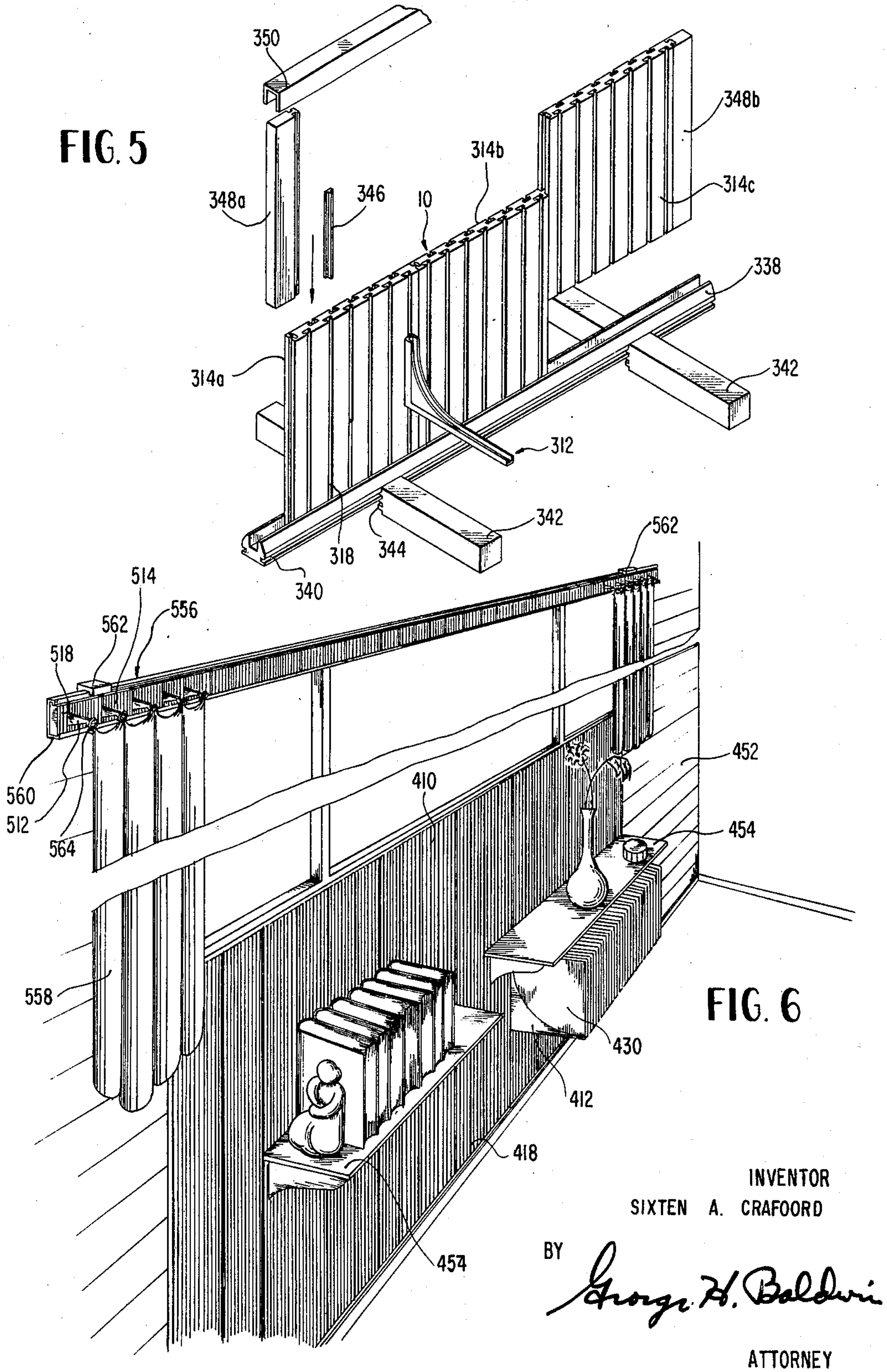
FIGURE 5 is a reduced perspective view showing the assemblage of a support in accordance with the invention.
FIGURE 6 is a perspective view of another support in accordance with the invention.

In FIGURE 5, a double-slotted rack incorporating the components hereinabove described is illustrated, partially assembled. Components of the embodiment of FIGURE 5 corresponding to those of the aforedescribed embodiments are illustrated by like numerals only of a higher order. As shown in FIGURE 5, in addition to the segments 314A, 314B, and 314C, the support further comprises a base support channel 338 configured to receive the segments therein and is provided with longitudinal slots 340 in the vertical faces thereof. A pair of transverse leg members 342, having keys 344 slidably received in the slots 340 are disposed in spaced parallel relationship to one another to provide transverse support for the base channel 338.

An elongated stop member 346, configured to slidably fit into the slots 318, is shown disposed above the segment 314A. End members 348A and 348B and a top channel member 350 provide an enclosure and decorative finish for the assembled components. The end members fit into corresponding grooves or tongues of the segments 314A and 314C, respectively. The top channel member 350 is of suitable length to enclose the edge surfaces of the assembled segments 314A through 314C and the end members 348A and 348B.

In assembling the device of FIGURE 5, the leg members 342 are positioned on base member 338 with the keys 344 inserted in the slots 340, and are suitably located with respect to one another to provide the required lateral support. The segments 314A, 314B and 314C are then interconnected by slidably engaging their respective tongues and grooves and the resultant structure is inserted in the base channel 338. The end members 348A and 348B are then connected to the segments 314A and 314C, respectively, by slidable engagement of the respective tongues and grooves. The desired height for the holder 312 is then determined and a stop 346 of suitable length is inserted in the groove 318 to bottom against the base channel 338. The holder 312 is then connected to the support 10 by insertion of the key 34 into the slot 18 until it abuts the upper edge of the stop 346. A second stop, equal in length to the remainder of the groove above the holder 312, may be inserted to prevent upward displacement of the holder during use, if so desired, although such second stop will normally be omitted. Finally, the top channel 350 is disposed over the upper edges of the segments 314A, 314B and 314C and the end members 348A and 348B to complete the assembly. Each of the aforedescribed components may be fixed in place by set screws, bolts or any other suitable fastening device as appropriate.

A suitable stop to perform the function of stop 346 in the embodiment of FIGURE 4 would comprise a desired length of cylindrical rod having the same diameter as the enlarged key end portion 136.

In FIGURE 6, a variation of the invention incorporated in an architectural wall panel, is illustrated. In this embodiment, components thereof corresponding to like components of the aforedescribed embodiments are indicated by like numerals only of the next higher order. The support 410, comprising a panel fixed to a wall 452, is provided with a plurality of vertical slots 418 which receive a plurality of record jacket storing holders 412. The upper edge of the support 410 may be left partly exposed enabling ready reception of the record holders, shelf brackets, hooks, or other holder devices, and, if desired, a removable stripping (not shown) may be supplied, to provide a decorative finish, for example. In addition to the holders 412, shelves 454 may also be assembled on the support 410, as shown.

It should be obvious that, with the embodiment of FIGURE 6, great flexibility in display and/or storage is provided and that several banks of holders 412 may be provided to furnish the required storage and/or display space.

In addition to the aforedescribed use of the devices in accordance with this invention, with certain modifications, it should be obvious that the invention may be applied to other uses if desired. For example, with reference again to FIGURE 6, the invention is applied to a curtain rod, shown generally at 556, which serves to support drapes or curtain 558. The rod comprises a horizontally disposed channel member 50 mounted on the wall through brackets 562. A plurality of segments 514 have vertical slots 518. A plurality of hooked holders 512 are disposed in the slots 518 in the manner of the aforedescribed embodiments and serve to support the curtain through rings 564.

Figure 7:
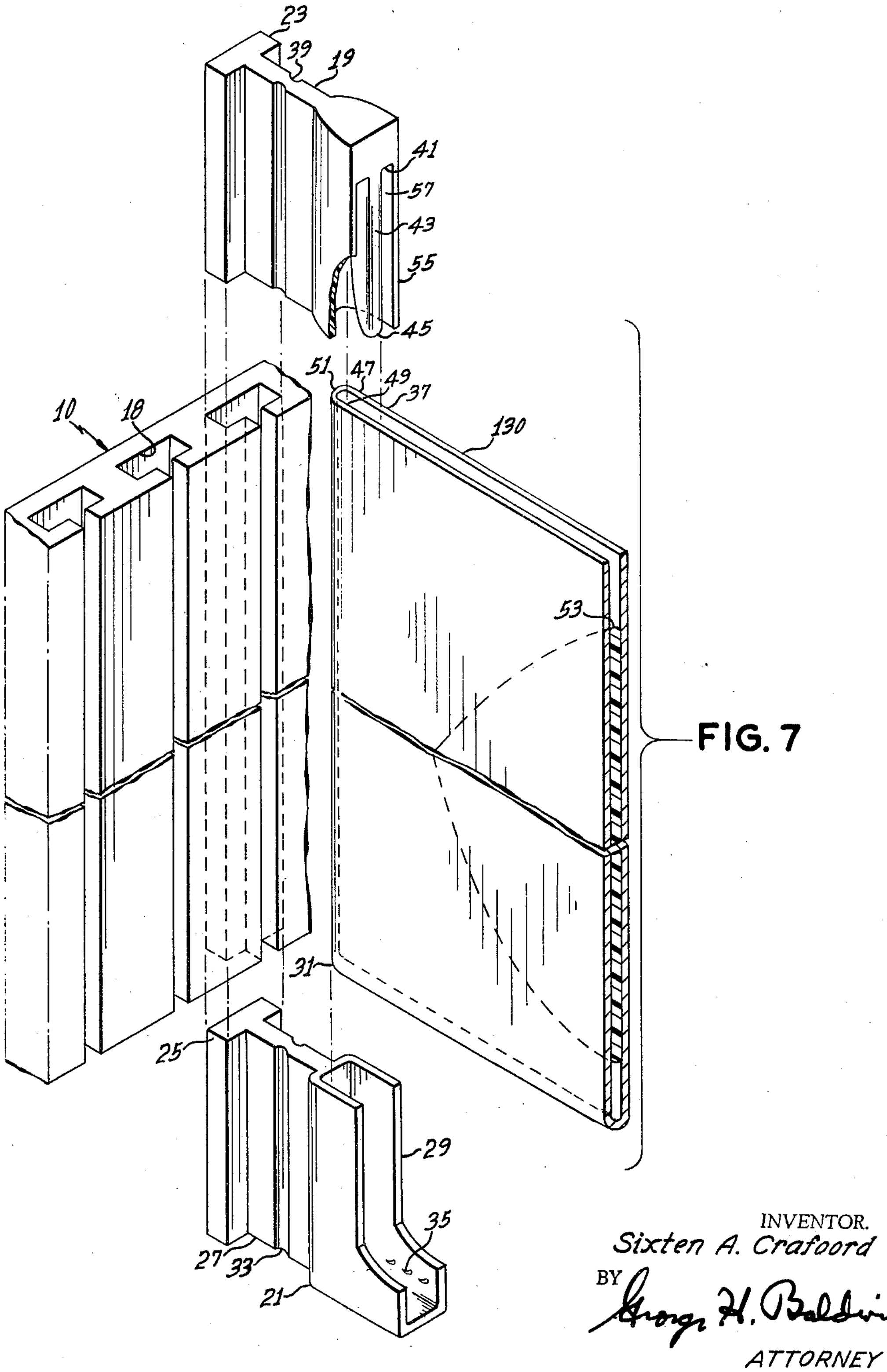
FIGURE 7 is an exploded perspective fragmentary view of a second embodiment of a record holder, a portion of a supporting panel and a portion of a record and jacket in accordance with the invention.

The phonograph record holding arrangement shown in FIGURE 7 comprises a support member 10 with grooves 18 as previously described. Two holder members 19 and 21 are provided, each including a key 23, 25 illustrated as corresponding to key 34, but which may, of course, be of the form shown in FIGURE 4.

The lower holder 21 includes a hinge web portion 27 connecting between key 25 and a channelled angle portion 29 conformed to receive the lower corner portion 31 of a record jacket 130 of the type commonly used for disc phonograph records. A weakened hinge area 33 of web 27 may be provided to permit ready swinging of the angle receptacle portion of the holder, assuming the holder to be of a material having the desirable bending characteristics of polypropylene. It is desirable that the channelled portion of the holder be provided with means to grip the jacket corner portion 31 when it is nested therein, and small teeth 35 are suitable to accomplish this purpose.

In use, the keys of the members 19 and 21 are engaged in one of the grooves 18, and a suitable stop, such as a member 346 as previously described, is disposed below the key of holder 21. The upper holder 19 is raised, along the groove, corner portion 31 is inserted into the channelled angle portion 29, the upper corner portion 37 of the record jacket is brought under holder 19 and this holder is finally brought down to engage and grip corner portion 37.

The upper member includes a hinge portion 39, similar to that of member 21, joining key 23 to a horizontal upper bar or rest portion 41 and a finger or prong 43. The finger extends downwardly, preferably vertically, from the upper bar 41 and terminates in a tapered or somewhat sharpened lower end 45 which guides the finger into the interior of the record jacket between the upper edges 47 and 49 immediately adjacent the folded vertical edge 51 of the jacket. With the finger inserted the bar portion 41 meets the upper edges 47 and 49 of the jacket. The finger is thin and narrow, permitting the record 53 to be slipped out of the jacket without removal from the holders, although it is a simple matter to remove and to later replace the jacket when desired.

The upper holder 19 is shown as including a skirt portion 55 depending from bar portion 41 and disposed outwardly around the finger. The skirt forms a socket 57 into which the upper corner portion 37 of the record jacket is received when the finger is inserted. The skirt serves to make the attachment more secure and to minimize the chance of damaging the record jacket.

It will be apparent that the key 136 and support 110 as described in connection with FIG. 4 may be substituted for the keys 23 and 25 and support 10 as shown in FIG. 7, if desired, and that, if such substitution is made, the respective connecting means between the key 25 and channel 21 and between the key 23 and bar portion 41 are not necessarily hingable as at 39 but may be rigid connections.

What has been set forth above is intended primarily as illustrative to enable those skilled in the art in the practice of the invention. It should therefore be understood that, within the scope of the appended claims, the invention may be practiced other than as specifically described.

What is new and therefore desired to be protected by Letters Patent of the United States is:

1. A holding device comprising a support and at least one holder; said support comprising a member having an exposed vertically linear surface and at least one straight elongated vertical slot formed in said surface thereof, said holder comprising a first portion adapted and arranged supportingly to engage an object to be supported and an elongated key portion joined to said first portion, said key portion being slidably disposable in said slot to connect said holder to said member, an elongated stop element slideably disposable in said slot below said key portion and having an upper end engageable by said key portion to fix the vertical disposition of said holder with respect to said support, mounting means comprising a horizontally disposed bottom channel configured to receive the lower edge of said member and at least one transverse member connected to said channel to provide lateral support therefor, said stop element having a lower end engaging said channel.

2. In a support for phonograph record jackets, a support member and a holder member, said support member being provided with a retaining slot, said holder member comprising a key portion detachably retained in said slot, an upwardly open channel portion adapted and arranged to receive a portion of the record jacket therein, and a hinge portion connecting between said key and channel portion establishing a vertical hinge axis on which said channel portion and the jacket supported thereby are swingable back and forth.

3. The combination according to claim 2 wherein said channel portion extends horizontally under the full length of the lower edge of the record jacket and upwardly along the full height of a side edge of the record jacket.

4. The combination according to claim 2 wherein said holder and said key are integrally formed of a flexible material, the hinged connection therebetween comprising a reduced cross section of said material.

5. The combination according to claim 3 wherein at least one relatively thin web spans the intersecting corner of said horizontal and vertical channel.

6. The combination according to claim 2 further including a retaining member comprising a key adapted to be vertically slideably retained in said slot above said key portion, a bar attached to said key to extend outwardly from said slot and a finger extending downwardly from said bar and adapted for insertion into an open upper corner portion of the record jacket of which a lower edge portion is disposed in said channel portion.

7. The combination according to claim 6 wherein said bar comprises a hinge portion for coordinate swinging of said finger and said channel portion as said jacket is swung back and forth.

8. In a holding arrangement for holding phonograph record jackets, a support member having an exposed vertically linear surface and having a plurality of laterally spaced parallel vertical slots formed in said member and opening through said surface thereof, each said slot having a portion inwardly of said surface which is wider than its opening at said surface, a record jacket holder comprising a horizontal upwardly opening channel portion for receiving the lower edge of a record jacket, a vertically elongated key caged in one of said slots and connecting means adapted to extend through the opening of such one slot and being joined to said key and said channel portion, said key and such one slot constituting connecting means for movably mounting said holder to said support member, one of said connecting means being a hinge connection establishing a vertical axis on which said channel portion may swing back and forth.

9. The combination according to claim 8 wherein said key is a generally upright cylinder and the inner portions of said slots are conformingly generally cylindrical, said key and such one slot constituting said hinge connection and said vertical hinge axis being substantially coincident with the slot and key axes.

10. The combination according to claim 8 further including a retaining member comprising a key portion, a finger portion and connection means connecting said key portion and said finger portion, said key portion being adapted for slideable caged engagement in such one slot above said vertically elongated key of said holder and said finger being adapted and arranged to extend downwardly into an open upper corner portion of a record jacket of which the lower edge is engaged in said channel portion, said key portion and said one slot constituting connection means for vertically movably mounting said retaining member to said support member, one of said connection means being a hinge connection and establishing a hinge axis generally aligned with said vertical axis, whereby said finger may swing with said channel portion and the record jacket.

11. In a holding arrangement for holding phonograph record jackets, a support member having an exposed vertically linear surface and having a plurality of laterally spaced parallel vertical slots formed in said member and opening through said surface thereof, each said slot having a portion inwardly of said surface which is wider than its opening at said surface, means attached to said member comprising a rest surface arranged to supportingly underlie the lower edge of an upright record jacket, a retaining device disposed alignedly above said rest surface and comprising a key vertically slideably caged in one of said slots, a finger and a connecting bar adapted to extend through the opening of such one slot, said bar extending between and being joined to said key and said finger, said finger extending downwardly from said bar and being adapted and arranged to enter downwardly into an open upper corner portion of a record jacket supported on said rest surface and removably to retain such jacket in upright position.

12. The combination according to claim 11 wherein said retaining device includes a skirt depending from said bar outwardly around said finger disposed to extend along the outer surface of the record jacket corner portion into which said finger extends.

References Cited

UNITED STATES PATENTS

| | | | |
|---|---|---|---|
| 1,429,076 | 9/1922 | Helsley | 211—40 |
| 1,599,653 | 9/1926 | Cranston | 248—224 |
| 3,092,256 | 6/1963 | Vernik | 211—40 |
| 3,207,318 | 9/1965 | Gilbert | 211—40 |
| 3,258,126 | 6/1966 | Frey | 211—40 |
| 3,374,794 | 3/1968 | Reed | 211—40 |

JAMES A. LEPPINK, Primary Examiner

U.S. Cl. X.R.

248—224

UNITED STATES PATENT OFFICE

CERTIFICATE OF CORRECTION

Patent No. 3,502,222 Dated March 24, 1970

Inventor(s) Sixten A. Crafoord

It is certified that error appears in the above-identified patent and that said Letters Patent are hereby corrected as shown below:

Column 3, line 39, "component" should read -- components --

Column 3, line 51, after "be" insert -- especially resistant to fatigue imposed by flexing or --

Column 5, line 15, "50" should read -- 560 --

SIGNED AND SEALED

SEP 15 1970

(SEAL)

Attest:

Edward M. Fletcher, Jr.
Attesting Officer

WILLIAM E. SCHUYLER, JR.
Commissioner of Patents